(12) United States Patent
Miwa (10) Patent No.: US 9,639,096 B2
(45) Date of Patent: May 2, 2017

(54) CONTROLLING THE OPERATIONAL RATE OF THE FREEZING OR REFRIGERATION UNIT IN A SHOWCASE

(75) Inventor: Kazuo Miwa, Tokyo (JP)

(73) Assignee: TECHNOMIRAI CO., LTD., Tokyo (JP)

( * ) Notice: Subject to any disclaimer, the term of this patent is extended or adjusted under 35 U.S.C. 154(b) by 1085 days.

(21) Appl. No.: 13/823,588

(22) PCT Filed: Feb. 25, 2011

(86) PCT No.: PCT/JP2011/054288
§ 371 (c)(1),
(2), (4) Date: Mar. 14, 2013

(87) PCT Pub. No.: WO2012/056736
PCT Pub. Date: May 3, 2012

(65) Prior Publication Data
US 2013/0173068 A1   Jul. 4, 2013

(30) Foreign Application Priority Data

Oct. 27, 2010   (WO) .................. PCT/JP2010/069100

(51) Int. Cl.
*G05D 23/19*   (2006.01)
*F24F 11/00*   (2006.01)
(Continued)

(52) U.S. Cl.
CPC ............ *G05D 23/19* (2013.01); *F24F 11/006* (2013.01); *F25D 29/00* (2013.01); *G06Q 50/00* (2013.01);
(Continued)

(58) Field of Classification Search
None
See application file for complete search history.

(56) References Cited

U.S. PATENT DOCUMENTS 2,892,324 A * 6/1959 Quick .................... F24F 3/044
62/183
3,063,256 A * 11/1962 Lamb .................... A47F 3/0447
454/193
(Continued)

FOREIGN PATENT DOCUMENTS

CN   1499157 A   5/2004
JP   10-026389 A   1/1998
(Continued)

OTHER PUBLICATIONS

Baxter, V.D., "IEA Annex 26: Advanced Supermarket Refrigeration/Heat Recovery Systems, Final Report vol. 1—Executive Summary", Apr. 2003, Oak Ridge National Laboratory, pp. 1-72.*

(Continued)

*Primary Examiner* — Kidest Bahta
*Assistant Examiner* — Kelvin Booker
(74) *Attorney, Agent, or Firm* — Michael Best & Friedrich LLP (57) ABSTRACT

A showcase control system 100 comprises a showcase operating rate detection unit 11 that detects a showcase operating rate of a showcase control unit 30 which controls freezing or refrigerating inside a showcase, an over-operating detection unit 12 that outputs an over-operating signal when the showcase operating rate input from the showcase operating rate detection unit 11 exceeds a predetermined value, and an air-conditioning control system 20 that curtails the energy-saving control of an air conditioner 50 when receiving an over-operating signal from the over-operating detection unit 12. Thereby, it is possible to comprehensively perform energy-saving control of a showcase and an air conditioner at a sales space where the showcase is installed.

9 Claims, 8 Drawing Sheets

(51) Int. Cl.
*F25D 29/00* (2006.01)
*G06Q 50/00* (2012.01)
*A47F 3/04* (2006.01)

(52) U.S. Cl.
CPC ..... *A47F 3/0482* (2013.01); *F24F 2011/0013* (2013.01); *F24F 2011/0016* (2013.01); *F24F 2011/0061* (2013.01)

(56) References Cited

U.S. PATENT DOCUMENTS

| | | | | |
|---|---|---|---|---|
| RE25,735 E | * | 3/1965 | Lamb | A47F 3/0447 62/234 |
| 6,742,349 B1 | * | 6/2004 | Kawai | G01K 1/026 700/278 |
| 7,225,627 B2 | * | 6/2007 | Wightman | F25B 41/04 62/115 |
| 2002/0148240 A1 | * | 10/2002 | Lawrence | A47F 3/0482 62/156 |
| 2003/0115892 A1 | * | 6/2003 | Fu | F25D 17/042 62/187 |
| 2003/0140638 A1 | * | 7/2003 | Arshansky | A47F 3/0482 62/155 |
| 2004/0020222 A1 | * | 2/2004 | Miwa | F24F 7/065 62/186 |
| 2004/0035128 A1 | * | 2/2004 | Kaji | A61L 9/22 62/264 |
| 2004/0159111 A1 | * | 8/2004 | Takegami | F25B 13/00 62/84 |
| 2004/0211202 A1 | * | 10/2004 | Katogi | F24F 11/006 62/175 |
| 2004/0244407 A1 | * | 12/2004 | Yamasaki | F25B 9/008 62/157 |
| 2005/0278040 A1 | * | 12/2005 | Itoh | G05B 15/02 700/11 |
| 2006/0032245 A1 | * | 2/2006 | Kates | F24F 3/1603 62/129 |
| 2006/0123835 A1 | * | 6/2006 | Takegami | F25B 13/00 62/498 |
| 2006/0201168 A1 | * | 9/2006 | Kates | F24F 11/0086 62/129 |
| 2007/0170174 A1 | * | 7/2007 | Segiet | G07F 9/105 219/621 |
| 2007/0170175 A1 | * | 7/2007 | Avendano | G07F 9/105 219/621 |
| 2007/0170177 A1 | * | 7/2007 | Avendano | G07F 9/105 219/679 |
| 2007/0170195 A1 | * | 7/2007 | Segiet | G07F 9/105 221/15 |
| 2008/0022695 A1 | * | 1/2008 | Welle | F25B 21/04 62/3.7 |
| 2008/0022696 A1 | * | 1/2008 | Welle | F25B 21/04 62/3.7 |
| 2008/0282728 A1 | * | 11/2008 | Takegami | F25B 1/10 62/498 |
| 2009/0007589 A1 | * | 1/2009 | Takegami | F25B 13/00 62/498 |
| 2009/0018705 A1 | * | 1/2009 | Ouchi | H02J 3/14 700/291 |
| 2009/0037142 A1 | * | 2/2009 | Kates | F24F 11/0086 702/182 |
| 2009/0125149 A1 | | 5/2009 | Miwa | |
| 2009/0183519 A1 | * | 7/2009 | Nishikawa | F25B 49/005 62/132 |
| 2010/0076603 A1 | * | 3/2010 | Kawaai | A47F 3/0482 700/275 |
| 2011/0042471 A1 | * | 2/2011 | Futaeda | F24D 3/18 236/51 |
| 2011/0167853 A1 | * | 7/2011 | Kawaai | F25B 5/02 62/228.3 |
| 2012/0042672 A1 | * | 2/2012 | Fujihara | F24F 3/14 62/157 |
| 2012/0137717 A1 | * | 6/2012 | Yamasaki | A47F 3/0482 62/246 |
| 2012/0216556 A1 | * | 8/2012 | Kanbara | F24F 11/006 62/129 |
| 2012/0297804 A1 | * | 11/2012 | Yamashita | F25B 25/005 62/207 |
| 2013/0061623 A1 | * | 3/2013 | Yamashita | F25B 13/00 62/238.7 |
| 2013/0173068 A1 | * | 7/2013 | Miwa | G05D 23/19 700/276 |
| 2013/0178997 A1 | * | 7/2013 | Miwa | F25D 21/006 700/295 |

FOREIGN PATENT DOCUMENTS

| | | |
|---|---|---|
| JP | 2002-327947 A | 11/2002 |
| JP | 2003-156279 A | 5/2003 |
| JP | 2004-205194 A | 7/2004 |
| JP | 2004-257666 A | 9/2004 |
| JP | 2004-309130 A | 11/2004 |
| JP | 2005-106444 A | 4/2005 |
| JP | 2007-064610 A | 3/2007 |
| JP | 2008-109813 A | 5/2008 |
| JP | 2008-128526 A | 6/2008 |
| WO | WO-2006/085406 A1 | 8/2006 |
| WO | WO-2012/056533 A1 | 5/2012 |

OTHER PUBLICATIONS

Fricke, B. and Becker, B., "2010 Energy Use of Doored and Open Vertical Refrigerated Display Cases", 2010, Intl. Refrigeration and Air Conditioning Conference, Purdue University, pp. 1-8.*
Walker, D.H.; Faramarzi, R.T. and Baxter, V.D., "Investigation of Energy-Efficient Supermarket Display Cases", Dec. 2004, ORNL/TM-2004/292, pp. 1-141.*
Extended Search Report issued in European Patent Application No. 11835880.3, dated Dec. 11, 2013.
International Search Report, mailed May 31, 2011.
Office Action issued in Chinese Application No. 201180028725.6, dated Apr. 24, 2015.

* cited by examiner

| HOURS | JANUARY | | | | | | FEBRUARY | | | | | | |
|---|---|---|---|---|---|---|---|---|---|---|---|---|---|
| | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE | A) CURRENT OUTSIDE AIR TEMPERATURE | B) TEMPERATURE DIFFERENCE FROM ROOM TEMPERATURE | C) OUTSIDE AIR TEMPERATURE COEFFICIENT | D) QUANTITY OF ELECTRIC POWER CONSUMPTION (KWH) | E) AVERAGE OPERATING RATE | F) AVERAGE SURPLUS RATE | G) CONTROL RATE |
| 9:00 | 5.3 | 16.7 | 0.70 | 0.634 | 0.366 | 0.37 | 4.9 | 17.1 | 0.72 | | 0.649 | 0.35 | 0.35 |
| 10:00 | 7.8 | 14.2 | 0.60 | 0.539 | 0.461 | 0.40 | 6.8 | 15.2 | 0.64 | | 0.577 | 0.42 | 0.40 |
| 11:00 | 8.2 | 13.8 | 0.58 | 0.524 | 0.476 | 0.40 | 6.9 | 15.1 | 0.64 | | 0.573 | 0.43 | 0.40 |
| 12:00 | 8.4 | 13.6 | 0.57 | 0.516 | 0.484 | 0.40 | 7.9 | 14.1 | 0.59 | | 0.535 | 0.46 | 0.40 |
| 13:00 | 8.3 | 13.7 | 0.58 | 0.520 | 0.480 | 0.40 | 8.3 | 13.7 | 0.58 | | 0.520 | 0.48 | 0.40 |
| 14:00 | 7.8 | 14.2 | 0.60 | 0.539 | 0.461 | 0.40 | 8.6 | 13.4 | 0.57 | | 0.509 | 0.49 | 0.40 |
| 15:00 | 7.1 | 14.9 | 0.63 | 0.566 | 0.434 | 0.40 | 8.9 | 13.1 | 0.55 | | 0.497 | 0.50 | 0.40 |
| 16:00 | 6.2 | 15.8 | 0.67 | 0.600 | 0.400 | 0.40 | 8.4 | 13.6 | 0.57 | | 0.516 | 0.48 | 0.40 |
| 17:00 | 4.8 | 17.2 | 0.73 | 0.653 | 0.347 | 0.35 | 7.3 | 14.7 | 0.62 | | 0.558 | 0.44 | 0.38 |
| 18:00 | 3.7 | 18.3 | 0.77 | 0.695 | 0.305 | 0.31 | 5.7 | 16.3 | 0.69 | | 0.619 | 0.38 | 0.33 |
| 19:00 | 3.0 | 19.0 | 0.80 | 0.722 | 0.278 | 0.28 | 4.4 | 17.6 | 0.74 | | 0.668 | 0.33 | 0.34 |
| 20:00 | 2.6 | 19.4 | 0.82 | 0.737 | 0.263 | 0.26 | 4.5 | 17.5 | 0.74 | | 0.665 | 0.34 | 0.34 |
| 21:00 | 2.3 | 19.7 | 0.83 | 0.748 | 0.252 | 0.25 | 4.7 | 17.3 | 0.73 | | 0.657 | 0.34 | 0.31 |
| 22:00 | 1.8 | 20.2 | 0.85 | 0.767 | 0.233 | 0.23 | 3.7 | 18.3 | 0.77 | | 0.695 | 0.31 | 0.28 |
| 23:00 | 1.7 | 20.3 | 0.86 | 0.771 | 0.229 | 0.23 | 3.1 | 18.9 | 0.80 | | 0.718 | 0.28 | 0.25 |
| 0:00 | 1.6 | 20.4 | 0.86 | 0.775 | 0.225 | 0.23 | 2.3 | 19.7 | 0.83 | | 0.748 | 0.25 | 0.20 |
| 1:00 | 3.7 | 18.3 | 0.77 | 0.695 | 0.305 | 0.31 | 1.0 | 21.0 | 0.89 | | 0.797 | 0.20 | 0.17 |
| 2:00 | 3.1 | 18.9 | 0.80 | 0.718 | 0.282 | 0.28 | 0.1 | 21.9 | 0.92 | | 0.832 | 0.17 | 0.13 |
| 3:00 | 3.3 | 18.7 | 0.79 | 0.710 | 0.290 | 0.29 | -0.8 | 22.8 | 0.96 | | 0.866 | 0.13 | 0.12 |
| 4:00 | 3.1 | 18.9 | 0.80 | 0.718 | 0.282 | 0.28 | -1.1 | 23.1 | 0.97 | | 0.877 | 0.12 | 0.18 |
| 5:00 | 2.9 | 19.1 | 0.81 | 0.725 | 0.275 | 0.27 | 0.4 | 21.6 | 0.91 | | 0.820 | 0.18 | 0.10 |
| 6:00 | 3.0 | 19.0 | 0.80 | 0.722 | 0.278 | 0.28 | -1.7 | 23.7 | 1.00 | 13.5 | 0.900 | 0.10 | 0.13 |
| 7:00 | 3.3 | 18.7 | 0.79 | 0.710 | 0.290 | 0.29 | -0.8 | 22.8 | 0.96 | | 0.866 | 0.13 | 0.27 |
| 8:00 | 3.7 | 18.3 | 0.77 | 0.695 | 0.305 | 0.31 | 2.8 | 19.2 | 0.81 | | 0.729 | 0.27 | |
| AVERAGE TEMPERATURE | 4.4 | | | | | | 4.0 | | | | | | |
| AVERAGE CONTROL RATE | | | | 0.667 | 0.333 | 0.32 | | | | | 0.683 | 0.32 | 0.30 |

F I G. 4

| HOURS | MARCH | | | | | | APRIL | | | | |
|---|---|---|---|---|---|---|---|---|---|---|---|
| | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE |
| 9:00 | 7.6 | 14.4 | 0.61 | 0.547 | 0.453 | 0.40 | 12.0 | 0.35 | 0.332 | 0.668 | 0.40 |
| 10:00 | 9.1 | 12.9 | 0.54 | 0.490 | 0.510 | 0.40 | 13.0 | 0.38 | 0.359 | 0.641 | 0.40 |
| 11:00 | 11 | 11 | 0.46 | 0.418 | 0.582 | 0.40 | 13.8 | 0.40 | 0.381 | 0.619 | 0.40 |
| 12:00 | 11.4 | 10.6 | 0.45 | 0.403 | 0.597 | 0.40 | 14.4 | 0.42 | 0.398 | 0.602 | 0.40 |
| 13:00 | 12.9 | 9.1 | 0.38 | 0.346 | 0.654 | 0.40 | 14.1 | 0.41 | 0.390 | 0.610 | 0.40 |
| 14:00 | 13.5 | 8.5 | 0.36 | 0.323 | 0.677 | 0.40 | 14.0 | 0.41 | 0.387 | 0.613 | 0.40 |
| 15:00 | 14.2 | 7.8 | 0.33 | 0.296 | 0.704 | 0.40 | 12.3 | 0.36 | 0.340 | 0.660 | 0.40 |
| 16:00 | 14.2 | 7.8 | 0.33 | 0.296 | 0.704 | 0.40 | 12.8 | 0.37 | 0.354 | 0.646 | 0.40 |
| 17:00 | 13.3 | 8.7 | 0.37 | 0.330 | 0.670 | 0.40 | 13.0 | 0.38 | 0.359 | 0.641 | 0.40 |
| 18:00 | 12.3 | 9.7 | 0.41 | 0.368 | 0.632 | 0.40 | 11.9 | 0.34 | 0.329 | 0.671 | 0.40 |
| 19:00 | 11.5 | 10.5 | 0.44 | 0.399 | 0.601 | 0.40 | 11.7 | 0.34 | 0.323 | 0.677 | 0.40 |
| 20:00 | 11.2 | 10.8 | 0.46 | 0.410 | 0.590 | 0.40 | 12.4 | 0.36 | 0.343 | 0.657 | 0.40 |
| 21:00 | 10.1 | 11.9 | 0.50 | 0.452 | 0.548 | 0.40 | 12.0 | 0.35 | 0.332 | 0.668 | 0.40 |
| 22:00 | 10.3 | 11.7 | 0.49 | 0.444 | 0.556 | 0.40 | 11.4 | 0.33 | 0.315 | 0.685 | 0.40 |
| 23:00 | 10.4 | 11.6 | 0.49 | 0.441 | 0.559 | 0.40 | 11.3 | 0.33 | 0.312 | 0.688 | 0.40 |
| 0:00 | 10.1 | 11.9 | 0.50 | 0.452 | 0.548 | 0.40 | 11.0 | 0.32 | 0.304 | 0.696 | 0.40 |
| 1:00 | 6.4 | 15.6 | 0.66 | 0.592 | 0.408 | 0.40 | 15.4 | 0.45 | 0.426 | 0.574 | 0.40 |
| 2:00 | 6.2 | 15.8 | 0.67 | 0.600 | 0.400 | 0.40 | 14.6 | 0.42 | 0.403 | 0.597 | 0.40 |
| 3:00 | 6.1 | 15.9 | 0.67 | 0.604 | 0.396 | 0.40 | 14.1 | 0.41 | 0.390 | 0.610 | 0.40 |
| 4:00 | 5.4 | 16.6 | 0.70 | 0.630 | 0.370 | 0.37 | 13.6 | 0.39 | 0.376 | 0.624 | 0.40 |
| 5:00 | 5.3 | 16.7 | 0.70 | 0.634 | 0.366 | 0.37 | 13.2 | 0.38 | 0.365 | 0.635 | 0.40 |
| 6:00 | 4.4 | 17.6 | 0.74 | 0.668 | 0.332 | 0.33 | 12.5 | 0.36 | 0.345 | 0.655 | 0.40 |
| 7:00 | 5.1 | 16.9 | 0.71 | 0.642 | 0.358 | 0.36 | 12.4 | 0.36 | 0.343 | 0.657 | 0.40 |
| 8:00 | 6.3 | 15.7 | 0.66 | 0.596 | 0.404 | 0.40 | 12.0 | 0.35 | 0.332 | 0.668 | 0.40 |
| AVERAGE TEMPERATURE | 9.5 | | | | | | 12.9 | | | | |
| AVERAGE CONTROL RATE | | | | 0.474 | 0.526 | 0.39 | | | 0.356 | 0.644 | 0.40 |

F I G. 5

| HOURS | MAY | | | | | JUNE | | | | |
|---|---|---|---|---|---|---|---|---|---|---|
| | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE |
| 9:00 | 15.7 | 0.46 | 0.434 | 0.566 | 0.40 | 24.0 | 0.70 | 0.663 | 0.337 | 0.34 |
| 10:00 | 16.6 | 0.48 | 0.459 | 0.541 | 0.40 | 26.0 | 0.75 | 0.718 | 0.282 | 0.28 |
| 11:00 | 19.6 | 0.57 | 0.542 | 0.458 | 0.40 | 26.5 | 0.77 | 0.732 | 0.268 | 0.27 |
| 12:00 | 20.1 | 0.58 | 0.555 | 0.445 | 0.40 | 28.1 | 0.81 | 0.776 | 0.224 | 0.22 |
| 13:00 | 21.3 | 0.62 | 0.589 | 0.411 | 0.40 | 28.6 | 0.83 | 0.790 | 0.210 | 0.21 |
| 14:00 | 22.1 | 0.64 | 0.611 | 0.389 | 0.39 | 27.9 | 0.81 | 0.771 | 0.229 | 0.23 |
| 15:00 | 22.0 | 0.64 | 0.608 | 0.392 | 0.39 | 27.1 | 0.79 | 0.749 | 0.251 | 0.25 |
| 16:00 | 22.8 | 0.66 | 0.630 | 0.370 | 0.37 | 26.3 | 0.76 | 0.727 | 0.273 | 0.27 |
| 17:00 | 18.5 | 0.54 | 0.511 | 0.489 | 0.40 | 25.6 | 0.74 | 0.707 | 0.293 | 0.29 |
| 18:00 | 17.5 | 0.51 | 0.484 | 0.516 | 0.40 | 24.2 | 0.70 | 0.669 | 0.331 | 0.33 |
| 19:00 | 16.9 | 0.49 | 0.467 | 0.533 | 0.40 | 22.7 | 0.66 | 0.627 | 0.373 | 0.37 |
| 20:00 | 16.6 | 0.48 | 0.459 | 0.541 | 0.40 | 21.7 | 0.63 | 0.600 | 0.400 | 0.40 |
| 21:00 | 16.0 | 0.46 | 0.442 | 0.558 | 0.40 | 21.3 | 0.62 | 0.589 | 0.411 | 0.40 |
| 22:00 | 15.2 | 0.44 | 0.420 | 0.580 | 0.40 | 20.7 | 0.60 | 0.572 | 0.428 | 0.40 |
| 23:00 | 15.4 | 0.45 | 0.426 | 0.574 | 0.40 | 20.4 | 0.59 | 0.564 | 0.436 | 0.40 |
| 0:00 | 13.4 | 0.39 | 0.370 | 0.630 | 0.40 | 20.4 | 0.59 | 0.564 | 0.436 | 0.40 |
| 1:00 | 19.9 | 0.58 | 0.550 | 0.450 | 0.40 | 19.2 | 0.56 | 0.531 | 0.469 | 0.47 |
| 2:00 | 20.1 | 0.58 | 0.555 | 0.445 | 0.40 | 18.2 | 0.53 | 0.503 | 0.497 | 0.40 |
| 3:00 | 20.7 | 0.60 | 0.572 | 0.428 | 0.40 | 17.8 | 0.52 | 0.492 | 0.508 | 0.40 |
| 4:00 | 19.9 | 0.58 | 0.550 | 0.450 | 0.40 | 17.7 | 0.51 | 0.489 | 0.511 | 0.40 |
| 5:00 | 20.0 | 0.58 | 0.553 | 0.447 | 0.40 | 18.3 | 0.53 | 0.506 | 0.494 | 0.40 |
| 6:00 | 18.3 | 0.53 | 0.506 | 0.494 | 0.40 | 19.1 | 0.55 | 0.528 | 0.472 | 0.40 |
| 7:00 | 19.0 | 0.55 | 0.525 | 0.475 | 0.40 | 20.7 | 0.60 | 0.572 | 0.428 | 0.40 |
| 8:00 | 17.9 | 0.52 | 0.495 | 0.505 | 0.40 | 22.0 | 0.64 | 0.608 | 0.392 | 0.40 |
| AVERAGE TEMPERATURE | 18.6 | | | | | 22.7 | | | | |
| AVERAGE CONTROL RATE | | | 0.513 | 0.487 | 0.40 | | | 0.627 | 0.373 | 0.35 |

FIG. 6

| HOURS | JULY | | | | | | AUGUST | | | | | |
|---|---|---|---|---|---|---|---|---|---|---|---|---|
| | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | QUANTITY OF ELECTRIC POWER CONSUMPTION (KWH) | AVERAGE OPERATING RATE | AVERAGE SURPLUS RATE | CONTROL RATE |
| 9:00 | 24.5 | 0.71 | 0.677 | 0.323 | 0.32 | 28.3 | 0.82 | | 0.782 | 0.218 | 0.22 |
| 10:00 | 25.3 | 0.73 | 0.699 | 0.301 | 0.30 | 29.8 | 0.86 | | 0.823 | 0.177 | 0.18 |
| 11:00 | 25.2 | 0.73 | 0.696 | 0.304 | 0.30 | 31.8 | 0.92 | | 0.879 | 0.121 | 0.12 |
| 12:00 | 25.2 | 0.73 | 0.696 | 0.304 | 0.30 | 33.1 | 0.96 | | 0.915 | 0.085 | 0.09 |
| 13:00 | 25.4 | 0.74 | 0.702 | 0.298 | 0.30 | 33.1 | 0.96 | | 0.915 | 0.085 | 0.09 |
| 14:00 | 25.2 | 0.73 | 0.696 | 0.304 | 0.30 | 34.5 | 1.00 | 14.3 | 0.953 | 0.047 | 0.05 |
| 15:00 | 24.8 | 0.72 | 0.685 | 0.315 | 0.31 | 33.3 | 0.97 | | 0.920 | 0.080 | 0.08 |
| 16:00 | 24.6 | 0.71 | 0.680 | 0.320 | 0.32 | 31.2 | 0.90 | | 0.862 | 0.138 | 0.14 |
| 17:00 | 24.6 | 0.71 | 0.680 | 0.320 | 0.32 | 29.8 | 0.86 | | 0.823 | 0.177 | 0.18 |
| 18:00 | 24.2 | 0.70 | 0.669 | 0.331 | 0.33 | 28.5 | 0.83 | | 0.788 | 0.212 | 0.21 |
| 19:00 | 24.0 | 0.70 | 0.663 | 0.337 | 0.34 | 27.7 | 0.80 | | 0.765 | 0.235 | 0.23 |
| 20:00 | 23.2 | 0.67 | 0.641 | 0.359 | 0.36 | 27.0 | 0.78 | | 0.746 | 0.254 | 0.25 |
| 21:00 | 23.0 | 0.67 | 0.636 | 0.364 | 0.36 | 26.8 | 0.78 | | 0.741 | 0.259 | 0.26 |
| 22:00 | 23.2 | 0.67 | 0.641 | 0.359 | 0.36 | 26.5 | 0.77 | | 0.732 | 0.268 | 0.27 |
| 23:00 | 22.8 | 0.66 | 0.630 | 0.370 | 0.37 | 26.5 | 0.77 | | 0.732 | 0.268 | 0.27 |
| 0:00 | 22.6 | 0.66 | 0.625 | 0.375 | 0.38 | 26.6 | 0.77 | | 0.735 | 0.265 | 0.26 |
| 1:00 | 22.9 | 0.66 | 0.633 | 0.367 | 0.37 | 25.7 | 0.74 | | 0.710 | 0.290 | 0.29 |
| 2:00 | 23.0 | 0.67 | 0.636 | 0.364 | 0.36 | 24.9 | 0.72 | | 0.688 | 0.312 | 0.31 |
| 3:00 | 22.4 | 0.65 | 0.619 | 0.381 | 0.38 | 24.9 | 0.72 | | 0.688 | 0.312 | 0.31 |
| 4:00 | 22.4 | 0.65 | 0.619 | 0.381 | 0.38 | 24.2 | 0.70 | | 0.669 | 0.331 | 0.33 |
| 5:00 | 22.5 | 0.65 | 0.622 | 0.378 | 0.38 | 24.6 | 0.71 | | 0.680 | 0.320 | 0.32 |
| 6:00 | 22.6 | 0.66 | 0.625 | 0.375 | 0.38 | 24.8 | 0.72 | | 0.685 | 0.315 | 0.31 |
| 7:00 | 23.5 | 0.68 | 0.649 | 0.351 | 0.35 | 26.0 | 0.75 | | 0.718 | 0.282 | 0.28 |
| 8:00 | 24.0 | 0.70 | 0.663 | 0.337 | 0.34 | 27.2 | 0.79 | | 0.752 | 0.248 | 0.25 |
| AVERAGE TEMPERATURE | 23.8 | | | | | 28.2 | | | | | |
| AVERAGE CONTROL RATE | | | 0.658 | 0.342 | 0.34 | | | | 0.779 | 0.221 | 0.22 |

FIG. 7

| HOURS | SEPTEMBER | | | | | OCTOBER | | | | |
|---|---|---|---|---|---|---|---|---|---|---|
| | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE |
| 9:00 | 24.8 | 0.72 | 0.685 | 0.315 | 0.31 | 17.9 | 0.52 | 0.495 | 0.505 | 0.40 |
| 10:00 | 24.7 | 0.72 | 0.683 | 0.317 | 0.32 | 18.1 | 0.52 | 0.500 | 0.500 | 0.40 |
| 11:00 | 25.0 | 0.72 | 0.691 | 0.309 | 0.31 | 18.5 | 0.54 | 0.511 | 0.489 | 0.40 |
| 12:00 | 26.1 | 0.76 | 0.721 | 0.279 | 0.28 | 18.5 | 0.54 | 0.511 | 0.489 | 0.40 |
| 13:00 | 27.0 | 0.78 | 0.746 | 0.254 | 0.25 | 18.7 | 0.54 | 0.517 | 0.483 | 0.40 |
| 14:00 | 26.8 | 0.78 | 0.741 | 0.259 | 0.26 | 20 | 0.58 | 0.553 | 0.447 | 0.40 |
| 15:00 | 27.7 | 0.80 | 0.765 | 0.235 | 0.23 | 20.2 | 0.59 | 0.558 | 0.442 | 0.40 |
| 16:00 | 27.6 | 0.80 | 0.763 | 0.237 | 0.24 | 19.5 | 0.57 | 0.539 | 0.461 | 0.40 |
| 17:00 | 27.0 | 0.78 | 0.746 | 0.254 | 0.25 | 19.7 | 0.57 | 0.544 | 0.456 | 0.40 |
| 18:00 | 25.9 | 0.75 | 0.716 | 0.284 | 0.28 | 19.5 | 0.57 | 0.539 | 0.461 | 0.40 |
| 19:00 | 25.1 | 0.73 | 0.694 | 0.306 | 0.31 | 18.9 | 0.55 | 0.522 | 0.478 | 0.40 |
| 20:00 | 24.1 | 0.70 | 0.666 | 0.334 | 0.33 | 17.8 | 0.52 | 0.492 | 0.508 | 0.40 |
| 21:00 | 24.0 | 0.70 | 0.663 | 0.337 | 0.34 | 18 | 0.52 | 0.497 | 0.503 | 0.40 |
| 22:00 | 24.1 | 0.70 | 0.666 | 0.334 | 0.33 | 18.2 | 0.53 | 0.503 | 0.497 | 0.40 |
| 23:00 | 23.6 | 0.68 | 0.652 | 0.348 | 0.35 | 17.3 | 0.50 | 0.478 | 0.522 | 0.40 |
| 0:00 | 23.6 | 0.68 | 0.652 | 0.348 | 0.35 | 18.8 | 0.54 | 0.519 | 0.481 | 0.40 |
| 1:00 | 22.3 | 0.65 | 0.616 | 0.384 | 0.38 | 15.5 | 0.45 | 0.428 | 0.572 | 0.40 |
| 2:00 | 22.2 | 0.64 | 0.613 | 0.387 | 0.39 | 15.9 | 0.46 | 0.439 | 0.561 | 0.40 |
| 3:00 | 21.9 | 0.63 | 0.605 | 0.395 | 0.39 | 16 | 0.46 | 0.442 | 0.558 | 0.40 |
| 4:00 | 22.0 | 0.64 | 0.608 | 0.392 | 0.39 | 16.3 | 0.47 | 0.450 | 0.550 | 0.40 |
| 5:00 | 21.9 | 0.63 | 0.605 | 0.395 | 0.39 | 15.4 | 0.45 | 0.426 | 0.574 | 0.40 |
| 6:00 | 21.8 | 0.63 | 0.602 | 0.398 | 0.40 | 16.4 | 0.48 | 0.453 | 0.547 | 0.40 |
| 7:00 | 22.2 | 0.64 | 0.613 | 0.387 | 0.39 | 17.2 | 0.50 | 0.475 | 0.525 | 0.40 |
| 8:00 | 22.9 | 0.66 | 0.633 | 0.367 | 0.37 | 18.1 | 0.52 | 0.500 | 0.500 | 0.40 |
| AVERAGE TEMPERATURE / AVERAGE CONTROL RATE | 24.3 | | 0.673 | 0.327 | 0.33 | 17.9 | | 0.496 | 0.504 | 0.40 |

FIG. 8

| HOURS | NOVEMBER | | | | | | DECEMBER | | | | | |
|---|---|---|---|---|---|---|---|---|---|---|---|---|
| | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE |
| 9:00 | 11.6 | 10.4 | 0.30 | 0.287 | 0.713 | 0.40 | 6.7 | 15.30 | 0.65 | 0.581 | 0.419 | 0.40 |
| 10:00 | 12.5 | 9.5 | 0.28 | 0.263 | 0.737 | 0.40 | 10.3 | 11.70 | 0.49 | 0.444 | 0.556 | 0.40 |
| 11:00 | 12.6 | 9.4 | 0.27 | 0.260 | 0.740 | 0.40 | 11.9 | 10.10 | 0.43 | 0.384 | 0.616 | 0.40 |
| 12:00 | 12.6 | 9.4 | 0.27 | 0.260 | 0.740 | 0.40 | 12.5 | 9.50 | 0.40 | 0.361 | 0.639 | 0.40 |
| 13:00 | 12.6 | 9.4 | 0.27 | 0.260 | 0.740 | 0.40 | 13.8 | 8.20 | 0.35 | 0.311 | 0.689 | 0.40 |
| 14:00 | 12.7 | 9.3 | 0.27 | 0.257 | 0.743 | 0.40 | 14.3 | 7.70 | 0.32 | 0.292 | 0.708 | 0.40 |
| 15:00 | 12.6 | 9.4 | 0.27 | 0.260 | 0.740 | 0.40 | 13.4 | 8.60 | 0.36 | 0.327 | 0.673 | 0.40 |
| 16:00 | 12.1 | 9.9 | 0.29 | 0.274 | 0.726 | 0.40 | 11.6 | 10.40 | 0.44 | 0.395 | 0.605 | 0.40 |
| 17:00 | 11.4 | 10.6 | 0.31 | 0.293 | 0.707 | 0.40 | 10.2 | 11.80 | 0.50 | 0.448 | 0.552 | 0.40 |
| 18:00 | 10.8 | 11.2 | 0.32 | 0.309 | 0.691 | 0.40 | 9.2 | 12.80 | 0.54 | 0.486 | 0.514 | 0.40 |
| 19:00 | 10.7 | 11.3 | 0.33 | 0.312 | 0.688 | 0.40 | 8.4 | 13.60 | 0.57 | 0.516 | 0.484 | 0.40 |
| 20:00 | 10.9 | 11.1 | 0.32 | 0.307 | 0.693 | 0.40 | 7.6 | 14.40 | 0.61 | 0.547 | 0.453 | 0.40 |
| 21:00 | 10.9 | 11.1 | 0.32 | 0.307 | 0.693 | 0.40 | 6.6 | 15.40 | 0.65 | 0.585 | 0.415 | 0.40 |
| 22:00 | 11.0 | 11.0 | 0.32 | 0.304 | 0.696 | 0.40 | 6.5 | 15.50 | 0.65 | 0.589 | 0.411 | 0.40 |
| 23:00 | 11.0 | 11.0 | 0.32 | 0.304 | 0.696 | 0.40 | 6.1 | 15.90 | 0.67 | 0.604 | 0.396 | 0.40 |
| 0:00 | 10.8 | 11.2 | 0.32 | 0.309 | 0.691 | 0.40 | 5.8 | 16.20 | 0.68 | 0.615 | 0.385 | 0.38 |
| 1:00 | 9.9 | 12.1 | 0.35 | 0.334 | 0.666 | 0.40 | 2.5 | 19.50 | 0.82 | 0.741 | 0.259 | 0.26 |
| 2:00 | 9.2 | 12.8 | 0.37 | 0.354 | 0.646 | 0.40 | 3 | 19.00 | 0.80 | 0.722 | 0.278 | 0.28 |
| 3:00 | 8.6 | 13.4 | 0.39 | 0.370 | 0.630 | 0.40 | 1.9 | 20.10 | 0.85 | 0.763 | 0.237 | 0.24 |
| 4:00 | 9.1 | 12.9 | 0.37 | 0.356 | 0.644 | 0.40 | 1.5 | 20.50 | 0.86 | 0.778 | 0.222 | 0.22 |
| 5:00 | 8.1 | 13.9 | 0.40 | 0.384 | 0.616 | 0.40 | 1.2 | 20.80 | 0.88 | 0.790 | 0.210 | 0.21 |
| 6:00 | 8.3 | 13.7 | 0.40 | 0.379 | 0.621 | 0.40 | 0.4 | 21.60 | 0.91 | 0.820 | 0.180 | 0.18 |
| 7:00 | 11.9 | 10.1 | 0.29 | 0.279 | 0.721 | 0.40 | 1.3 | 20.70 | 0.87 | 0.786 | 0.214 | 0.21 |
| 8:00 | 11.7 | 10.3 | 0.30 | 0.285 | 0.715 | 0.4 | 3.1 | 18.90 | 0.80 | 0.718 | 0.282 | 0.28 |
| AVERAGE TEMPERATURE | 11.0 | | | | | | 7.1 | | | | | |
| AVERAGE CONTROL RATE | | | | 0.304 | 0.696 | 0.40 | | | | 0.567 | 0.433 | 0.34 |

CONTROLLING THE OPERATIONAL RATE OF THE FREEZING OR REFRIGERATION UNIT IN A SHOWCASE

TECHNICAL FIELD

The present invention relates to a showcase control system and a program for the same controlling a showcase in which frozen goods, refrigerated goods, or the like are set out in a supermarket, a convenience store, or the like. In particular, the present invention relates to a showcase control system and a program for the same for achieving appropriate energy saving with simplified calculations.

BACKGROUND ART

The inventor has proposed an air-conditioning control system in which a control rate for energy saving is calculated in consideration of an outside air temperature on the basis of an actual quantity of electric power used, to control an air conditioner according to the control rate (refer to Patent Literature 1).

CITATION LIST

Patent Literature

[Patent Literature 1] PCT/JP2010/069100

SUMMARY OF INVENTION

Technical Problem

However, conventionally, there is no system and program for performing energy-saving control so as to control a showcase and control an air conditioner at a sales space where the showcase is installed in a comprehensive manner. A showcase is for setting out frozen goods or refrigerated goods therein, and its preset temperature is low, and therefore, its quantity of electric power used is large for that reason. Therefore, in order to thoroughly perform comprehensive energy saving of a store, it is crucial to perform energy-saving control of the air conditioner with a high regard for energy saving of a showcase.

Accordingly, on research by the inventor, the inventor has found that the environment of a sales space where a showcase is installed has a large influence on energy saving of the showcase, that is, energy-saving control of an air conditioner at a sales space is sensitively performed, and the energy-saving control of the air conditioner is reviewed according to the state of the energy-saving control of the showcase, thereby lessening a freezing or refrigerating burden on the showcase, which results in making a significant contribution to comprehensive energy saving of a store including the showcase.

The present invention has been achieved in consideration of this problem, and an object of the present invention is to provide a showcase control system and a program for the same for comprehensively performing energy-saving control of a showcase and an air conditioner at a sales space where the showcase is installed.

Solution to Problem

A showcase control system of the present invention comprises showcase operating rate detection means for detecting an operating rate in showcase control means (hereinafter, this operating rate is called "showcase operating rate") for controlling freezing or refrigerating inside a showcase; over-operating detection means for outputting an over-operating signal when the showcase operating rate input from the showcase operating rate detection means exceeds a predetermined value; and an air-conditioning control system for curtailing energy-saving control of an air conditioner when receiving an over-operating signal from the over-operating detection means.

Further, because the showcase operating rate detection means detects an electric current flowing in the showcase control means, it is possible to easily detect a showcase operating rate.

Further, because the air-conditioning control system stops the energy-saving control of the air conditioner when receiving the over-operating signal, it is possible to immediately lower the showcase operating rate.

Further, the air-conditioning control system comprises outside air temperature input means to which outside air temperature information is input, outside air temperature coefficient calculation means for calculating, based on an outside air temperature calculated from the outside air temperature information input by the outside air temperature input means, a ratio of a current outside air temperature to an outside air temperature at a maximum temperature in air-cooling, and a ratio of a temperature difference between a current outside air temperature and a predetermined room temperature to a temperature difference between an outside air temperature at a minimum temperature and the room temperature in air-heating, as an outside air temperature coefficient, peak operating rate calculation means for calculating an average operating rate of an air conditioner at the maximum temperature in air-cooling, and an average operating rate of the air conditioner at the minimum temperature in air-heating, as a peak operating rate, average operating rate calculation means for calculating an hourly average operating rate by multiplying the peak operating rate calculated by the peak operating rate calculation means by the outside air temperature coefficient calculated by the outside air temperature coefficient calculation means, average surplus rate calculation means for calculating (1−average operating rate) as an average surplus rate with respect to the average operating rate calculated by the average operating rate calculation means, control rate calculation means for calculating a control rate whose maximum value is a predetermined value for the average surplus rate calculated by the average surplus rate calculation means, air-conditioning control means for performing energy-saving control of the air conditioner by a quantity of the control rate calculated by the control rate calculation means, case control rate calculation means for calculating a case control rate for performing energy-saving control of the showcase, and case control means for performing energy-saving control of the showcase by a quantity of the control rate calculated by the case control rate calculation means, thereby it is possible to achieve appropriate energy saving with simple calculations.

Further, the peak operating rate calculation means calculates an average operating rate by dividing an actual quantity of electric power used of the air conditioner by a rated quantity of electric power used, thereby it is possible to simply calculate a precise average operating rate.

Further, the predetermined value of the control rate calculation means is from 0.10 to 0.70, and the operating rate of the air conditioner is not remarkably lowered, which makes it possible to protect the equipment.

Further, the present invention is a program for making a computer function as the aforementioned system.

Advantageous Effects of Invention

According to the present invention, it is possible to provide a showcase control system and a program for the same for comprehensively performing energy-saving control of a showcase and an air conditioner at a sales space where the showcase is installed.

BRIEF DESCRIPTION OF DRAWINGS

FIG. 3 is a table showing an example of hourly control in January and February.

FIG. 4 is a table showing an example of hourly control in March and April.

FIG. 6 is a table showing an example of hourly control in July and August.

DESCRIPTION OF EMBODIMENTS

Hereinafter, modes for carrying out the present invention will be described in detail with reference to the accompanying drawings.

Example

Figure 1:
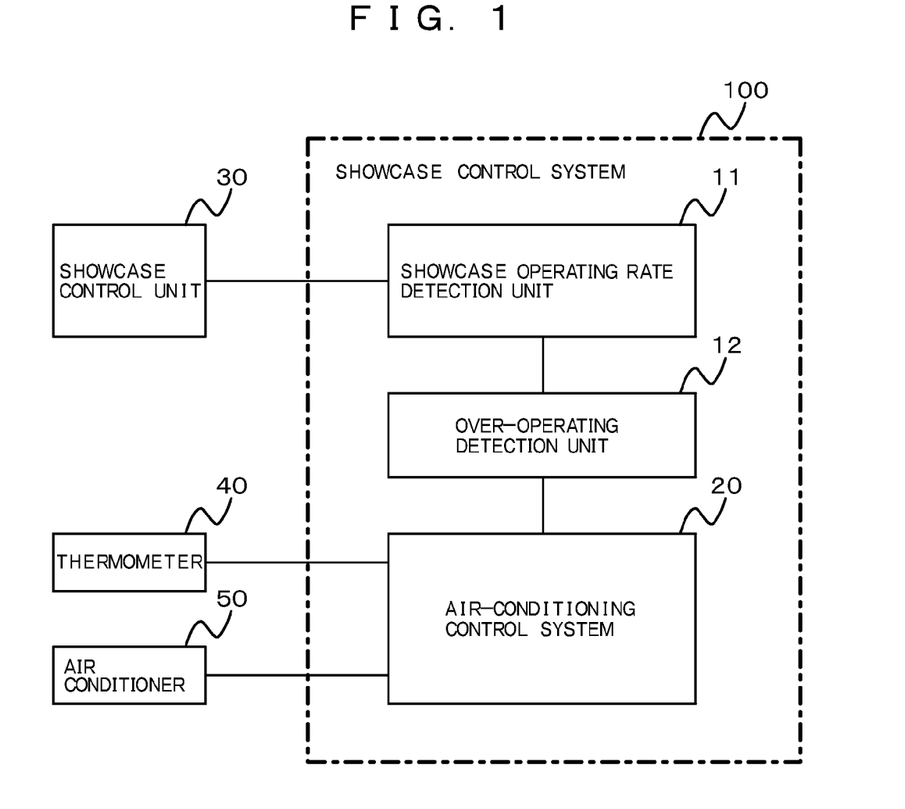
FIG. 1 is a diagram showing a configuration of a showcase control system according to an embodiment of the present invention.
Figure 2:
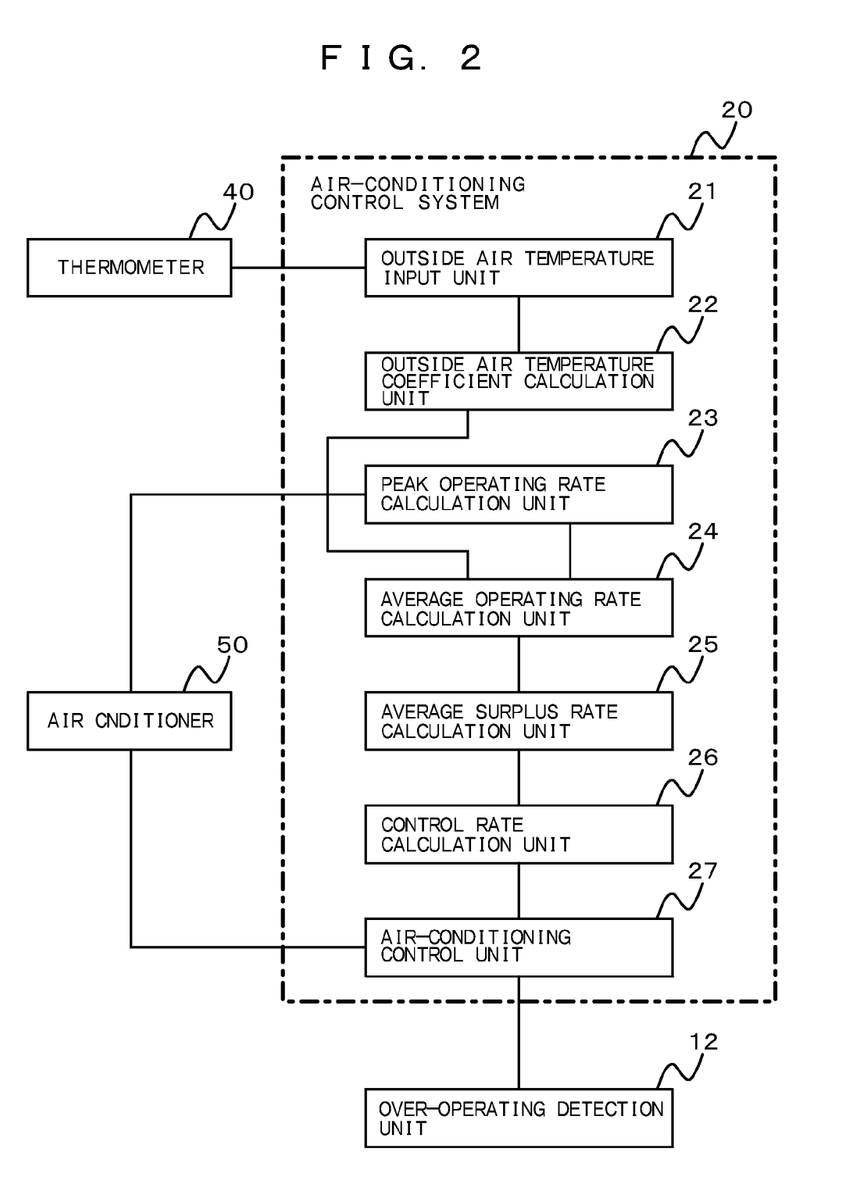
FIG. 2 is a diagram showing a partial detailed configuration of the showcase control system according to the embodiment of the present invention.
Figure 5:
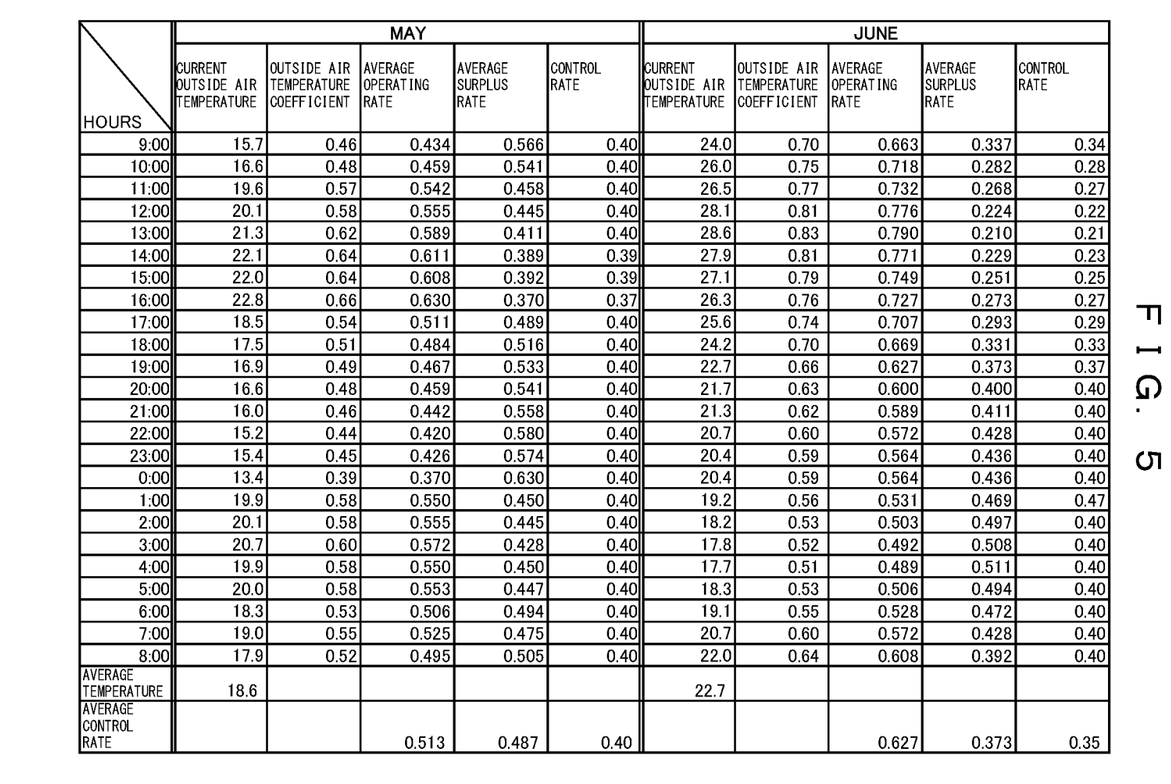
FIG. 5 is a table showing an example of hourly control in May and June.
Figure 7:
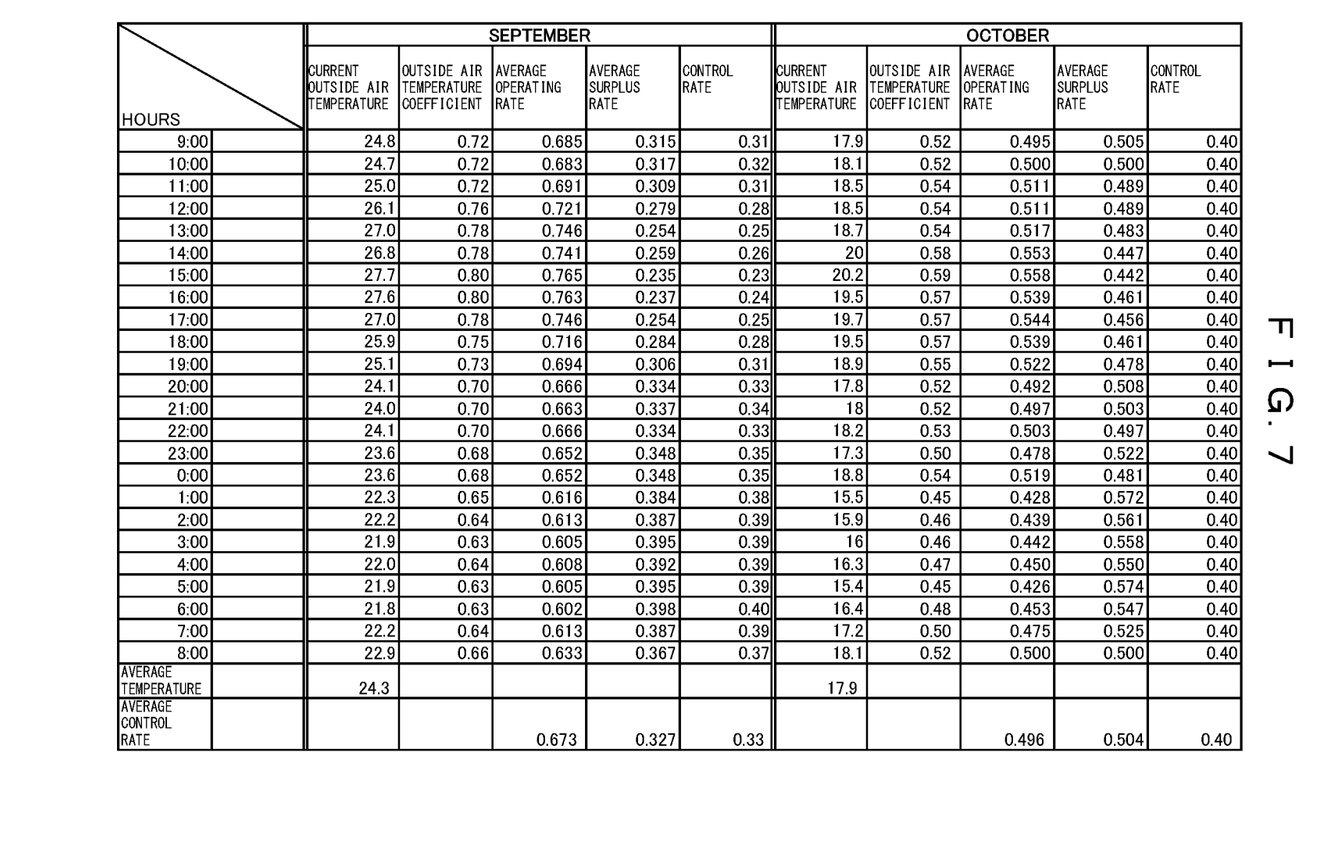
FIG. 7 is a table showing an example of hourly control in September and October.
Figure 8:
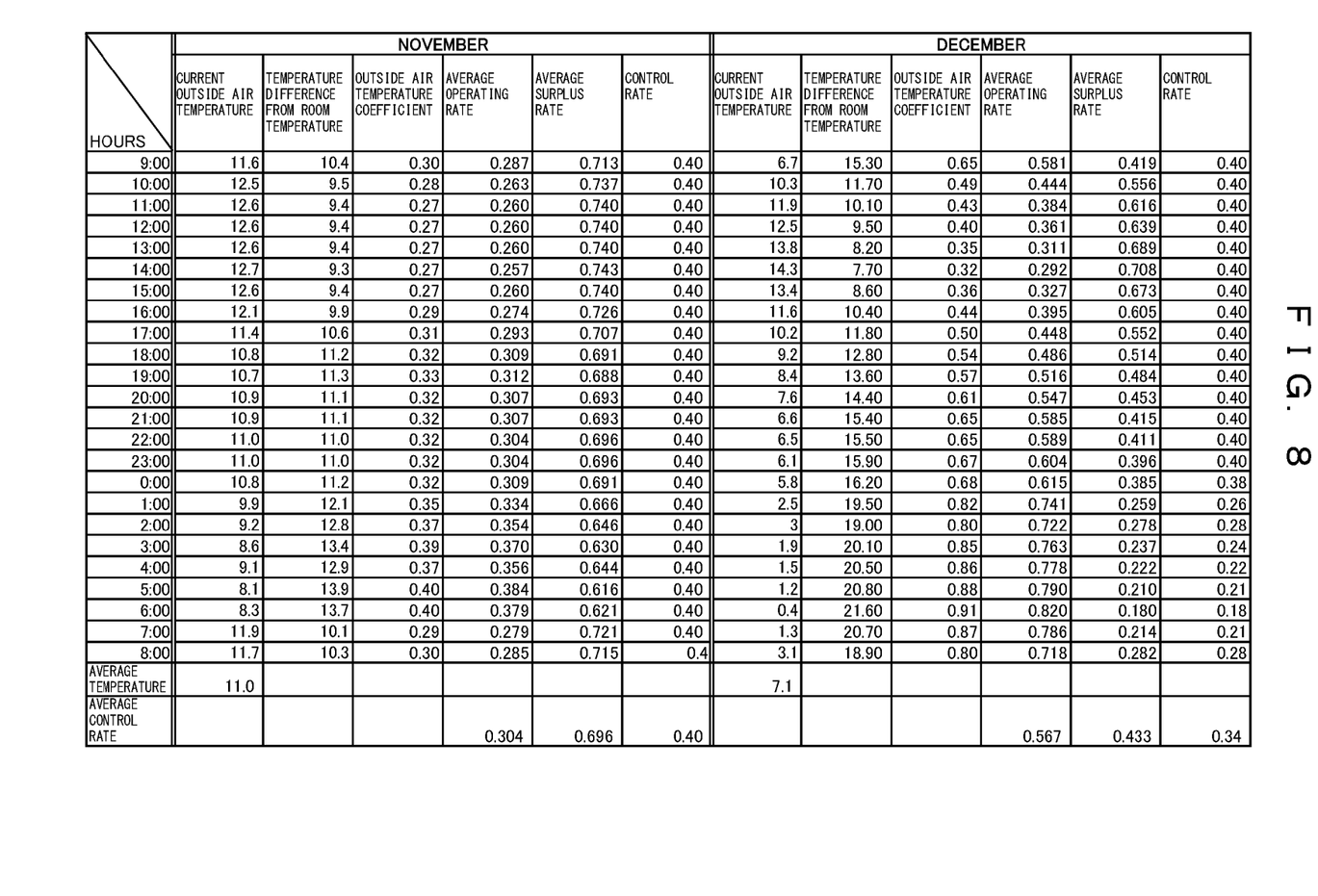
FIG. 8 is a table showing an example of hourly control in November and December.

FIG. 1 is a diagram showing a configuration of a showcase control system according to an embodiment of the present invention, and FIG. 2 is a diagram showing a partial detailed configuration thereof. A showcase control system 100 of the present embodiment comprises a showcase operating rate detection unit 11, an over-operating detection unit 12, and an air-conditioning control system 20. A showcase control unit 30, a thermometer 40, and an air conditioner 50 are described for explanation of the showcase control system 100 according to the present embodiment. The details of the air-conditioning control system 20 are shown in FIG. 2. In the present embodiment, an operating rate in the showcase control unit 30 (hereinafter, this operating rate is called "showcase operating rate") which controls a temperature for freezing or refrigerating articles in a showcase is detected, and in the case where the showcase operating rate exceeds a predetermined value, the energy-saving control of the air conditioner 50 is curtailed or stopped, which lowers a temperature of a sales space where the showcase is installed, to lower the showcase operating rate to the predetermined value or less, thereby achieving energy saving of the store as a whole. In addition, as an assumable case where a sales space rises in temperature to an unintended temperature, for example, there may be a case where it is impossible to detect only with a temperature that a controlled showcase is in overload because this system is incapable of detecting that a specific enthalpy value (air total heat) being high unless the humidity of the sales space is measured, a case where it is impossible for the control of air conditioning to follow an upsurge in visitors, or the like.

The showcase control unit 30 controls a temperature for freezing or refrigerating articles in a showcase. Specifically, it is, for example, a freezing machine or a refrigerating machine, and is preferably subjected to energy-saving control. For example, control rates are calculated and programmed in advance on the basis of average sales-space temperatures and specific enthalpy values (air total heat) per month, per business hour, non-business hour, or per day and night, etc., and the operation for freezing or refrigerating is performed as energy-saving control by a quantity of the control rate. The showcase operating rate detection unit 11 detects a showcase operating rate in the showcase control unit 30. Specifically, for example, it is possible to achieve the detection by measuring an electric current flowing in the showcase control unit 30, or by measuring electric power consumption in the showcase control unit 30, etc. The over-operating detection unit 12 compares a showcase operating rate detected by the showcase operating rate detection unit 11 with a predetermined value, and in the case where the showcase operating rate exceeds the predetermined value, the over-operating detection unit 12 outputs an over-operating signal. The air-conditioning control system 20 curtails or stops the energy-saving control of the air conditioner 50 when receiving an over-operating signal output from the over-operating detection unit 12.

The air-conditioning control system 20 comprises an outside air temperature input unit 21, an outside air temperature coefficient calculation unit 22, a peak operating rate calculation unit 23, an average operating rate calculation unit 24, an average surplus rate calculation unit 25, a control rate calculation unit 26, and an air-conditioning control unit 27. The air-conditioning control system 20 calculates a control rate for performing energy-saving control of the air conditioner 50, to perform energy-saving control of the air conditioner 50 appropriately according to the control rate. The control may be performed such that the air conditioner 50 is stopped (turned off), or inverter-controlled.

First, outside air temperature information is input to the outside air temperature input unit 21 from the thermometer 40 installed outdoors. The outside air temperature coefficient calculation unit 22 calculates an outside air temperature coefficient according to formula (1).

$$\text{Outside air temperature coefficient} = T/Tcp \text{(during air-cooling)} = (Tr-T)/(Tr-Twp) \text{(during air-heating)} \quad (1)$$

Where, T: Current outside air temperature

Tcp: Maximum outside air temperature (for example, at two p.m. in August)

Tr: Room temperature (for example 22° C., on the assumption that it is constant)

Twp: Minimum outside air temperature (for example, at six a.m. in February)

Specific examples of the outside air temperature coefficients are shown in FIGS. 3 to 8. In the present embodiment, air-cooling is performed from April to November, and air-heating is performed from December to March. The peak operating rate calculation unit 23 calculates a peak operating rate according to formula (2).

$$\text{Peak operating rate} = \text{Actual quantity of electric power used/Rated quantity of electric power used} \quad (2)$$

Where, the actual quantity of electric power used is an actual quantity of electric power used of the air conditioner 50 at the time of the maximum outside air temperature during air-cooling and at the time of the minimum outside air temperature during air-heating, and the rated quantity of electric power used is rated quantity of electric power used of the air conditioner 50.

The average operating rate calculation unit 24 calculates an average operating rate according to formula (3).

Average operating rate=Peak operating rate×outside air temperature coefficient (3)

The average surplus rate calculation unit 25 calculates an average surplus rate according to formula (4).

Average surplus rate=1−Average operating rate (4)

The control rate calculation unit 26 calculates a control rate according to formula (5).

Control rate=Average surplus rate(when average surplus rate<0.40)=0.40(when average surplus rate≥0.40) (5)

In this way, by setting an upper limit for the control rate, the operating rate is not remarkably lowered, and therefore, it is possible to protect the equipment.

The air-conditioning control unit 27 performs energy-saving control of the air conditioner 50 by a quantity of a control rate. For example, when a control rate is 0.40, the air conditioner 50 is stopped by 40% in a predetermined pattern, or the air conditioner 50 is inverter-controlled by electric power of 60% of a rated quantity of electric power used.

FIGS. 3 to 8 are tables showing examples of control rates for one year. The examples of current outside air temperatures, temperature differences with room temperature, outside air temperature coefficients, average operating rate s, average surplus rate s, and control rates hourly in the respective months are shown. The tables show that the quantities of electric power consumption at the time of the minimum outside air temperature and at the time of the maximum outside air temperature in February and August are respectively 13.5 (KWh) and 14.3 (KWh). In the present embodiment, the rated quantity of electric power used is 15 (KWh).

In this way, the present embodiment is to calculate a control rate for energy saving in consideration of an outside air temperature on the basis of an actual quantity of electric power used. Therefore, it is possible to perform appropriate energy-saving control with simplified calculations, which is practical and extremely beneficial.

In this way, according to the present invention, an air conditioner at a sales space where a showcase is installed is operated as energy-saving control, and the air conditioner is controlled such that the controlled showcase is not brought into over-operating, thereby lessening a freezing or refrigerating burden on the showcase, which results in making a great contribution to comprehensive energy saving of a store including the showcase.

In addition, the present invention is not limited to the above-described embodiment.

Because the voltage is supposed to be constant, a quantity of electric current used may replace the above-described quantity of electric power used.

Even if a predetermined value of the control rate calculation unit 26 is within a range from 0.10 to 0.70, it is possible to sufficiently achieve the object.

The showcase control system of the present invention may also be realized by a program to operate a computer as the present showcase control system. This program may be stored in a storage medium that can be read by a computer.

This storage medium recorded with the program may be a ROM itself of the showcase control system, or may be a storage medium such as a CD-ROM that can be read, when a program reading device such as a CD-ROM drive is provided as an external storage device, by inserting therein the storage medium.

Moreover, the abovementioned storage medium may be a magnetic tape, a cassette tape, a flexible disk, a hard disk, an MO/MD/DVD or the like, or a semiconductor memory.

The disclosure of the international patent application PCT/JP2010/069110, filed on Oct. 27, 2010 including its specification, claims and drawings, is incorporated herein by reference in its entirety.

REFERENCE SIGNS LIST

20 air-conditioning control system
21 outside air temperature input unit
22 outside air temperature coefficient calculation unit
23 peak operating rate calculation unit
24 average operating rate calculation unit
25 average surplus rate calculation unit
26 control rate calculation unit
27 air-conditioning control unit
30 showcase control unit
40 thermometer
50 air conditioner
100 showcase control system

The invention claimed is:

1. A showcase control system comprising:
showcase operating rate detection means for detecting a showcase operating rate in showcase control means for controlling freezing or refrigerating inside a showcase;
over-operating detection means for comparing a predetermined value with the showcase operating rate detected by the showcase operating rate detection means and outputting an over-operating signal when the showcase operating rate exceeds the predetermined value; and
an air-conditioning control system for curtailing energy-saving control of an air conditioner when receiving an over-operating signal from the over-operating detection means,
wherein the air-conditioning control system comprises
outside air temperature input means to which outside air temperature information is input,
outside air temperature coefficient calculation means for calculating, based on an outside air temperature calculated from the outside air temperature information input by the outside air temperature input means, a ratio of a current outside air temperature to an outside air temperature at a maximum temperature in air-cooling, and a ratio of a temperature difference between a current outside air temperature and a predetermined room temperature to a temperature difference between an outside air temperature at a minimum temperature in air-heating and the room temperature in air-heating, as an outside air temperature coefficient,
peak operating rate calculation means for calculating an average operating rate of an air conditioner at the maximum temperature in air-cooling, and an average operating rate of the air conditioner at the minimum temperature in air-heating, as a peak operating rate,
average operating rate calculation means for calculating an hourly average operating rate by multiplying the peak operating rate calculated by the peak operating rate calculation means by the outside air temperature coefficient calculated by the outside air temperature coefficient calculation means, average surplus rate calculation means for calculating an average surplus rate with respect to the average operating rate calculated by the average operating rate calculation means, control rate calculation means for calculating a control rate, a maximum value of the control rate is a predetermined value for the average surplus rate calculated by the average surplus rate calculation means, air-conditioning control means for performing energy-saving control of the air conditioner by a quantity of the control rate calculated by the control rate calculation means, case control rate calculation means for calculating a case control rate for performing energy-saving control of the showcase, and case control means for performing energy-saving control of the showcase by a quantity of the control rate calculated by the case control rate calculation means.

2. The showcase control system according to claim 1, wherein the peak operating rate calculation means calculates an average operating rate by dividing an actual quantity of electric power used of the air conditioner by a rated quantity of electric power used.

3. The showcase control system according to claim 2, wherein the predetermined value for the average surplus rate is from 0.10 to 0.70.

4. The showcase control system according to claim 1, wherein the predetermined value for the average surplus rate is from 0.10 to 0.70.

5. The showcase control system according to claim 1, wherein the showcase operating rate detection means detects an electric current flowing in the showcase control means.

6. The showcase control system according to claim 5, wherein the air-conditioning control system stops the energy-saving control of the air conditioner when receiving the over-operating signal.

7. The showcase control system according to claim 1, wherein the air-conditioning control system stops the energy-saving control of the air conditioner when receiving the over-operating signal.

8. The showcase control system according to claim 1, wherein the average surplus rate is:

1−the average operating rate calculated by the average operating rate calculation means.

9. A tangible non-transitory computer-readable storage medium having a program stored therein, wherein when executed on a computer, the program configures the computer to perform as the showcase control system comprising:

showcase operating rate detection means for detecting a showcase operating rate in showcase control means for controlling freezing or refrigerating inside a showcase;

over-operating detection means for comparing a predetermined value with the showcase operating rate detected by the showcase operating rate detection means and outputting an over-operating signal when the showcase operating rate exceeds the predetermined value; and an air-conditioning control system for curtailing energy-saving control of an air conditioner when receiving an over-operating signal from the over-operating detection means, wherein the air-conditioning control system comprises outside air temperature input means to which outside air temperature information is input, outside air temperature coefficient calculation means for calculating, based on an outside air temperature calculated from the outside air temperature information input by the outside air temperature input means, a ratio of a current outside air temperature to an outside air temperature at a maximum temperature in air-cooling, and a ratio of a temperature difference between a current outside air temperature and a predetermined room temperature to a temperature difference between an outside air temperature at a minimum temperature in air-heating and the room temperature in air heating, as an outside air temperature coefficient, peak operating rate calculation means for calculating an average operating rate of an air conditioner at the maximum temperature in air-cooling, and an average operating rate of the air conditioner at the minimum temperature in air-heating, as a peak operating rate, average operating rate calculation means for calculating an hourly average operating rate by multiplying the peak operating rate calculated by the peak operating rate calculation means by the outside air temperature coefficient calculated by the outside air temperature coefficient calculation means, average surplus rate calculation means for calculating an average surplus rate with respect to the average operating rate calculated by the average operating rate calculation means, control rate calculation means for calculating a control rate, a maximum value of the control rate is a predetermined value for the average surplus rate calculated by the average surplus rate calculation means, air-conditioning control means for performing energy-saving control of the air conditioner by a quantity of the control rate calculated by the control rate calculation means, case control rate calculation means for calculating a case control rate for performing energy-saving control of the showcase, and case control means for performing energy-saving control of the showcase by a quantity of the control rate calculated by the case control rate calculation means.

* * * * *